United States Patent
Coulombe et al.

(10) Patent No.: US 11,734,322 B2
(45) Date of Patent: Aug. 22, 2023

(54) ENHANCED INTENT MATCHING USING KEYWORD-BASED WORD MOVER'S DISTANCE

(71) Applicant: INTUIT INC., Mountain View, CA (US)

(72) Inventors: Gregory Kenneth Coulombe, Sherwood Park (CA); Roger C. Meike, Redwood City, CA (US); Cynthia Osmon, Sunnyvale, CA (US); Sricharan Kallur Palli Kumar, Mountain View, CA (US); Pavlo Malynin, Menlo Park, CA (US)

(73) Assignee: INTUIT, INC., Mountain View, CA (US)

( * ) Notice: Subject to any disclaimer, the term of this patent is extended or adjusted under 35 U.S.C. 154(b) by 384 days.

(21) Appl. No.: 16/686,876

(22) Filed: Nov. 18, 2019

(65) Prior Publication Data

US 2021/0149937 A1 May 20, 2021

(51) Int. Cl.
*G06F 16/33* (2019.01)
*G06F 16/35* (2019.01)
*G06F 40/253* (2020.01)
*G06F 40/216* (2020.01)
*G06N 3/08* (2023.01)

(52) U.S. Cl.
CPC .......... *G06F 16/3334* (2019.01); *G06F 16/35* (2019.01); *G06F 40/216* (2020.01); *G06F 40/253* (2020.01); *G06N 3/08* (2013.01)

(58) Field of Classification Search
CPC .... G06F 16/3334; G06F 16/35; G06F 40/216; G06F 40/253; G06F 40/284; G06F 40/30; G06N 3/08; G06N 3/006; G06N 3/0445; G06N 3/0454; G06N 5/041
See application file for complete search history.

(56) References Cited

U.S. PATENT DOCUMENTS

| 8,037,086 B1 * | 10/2011 | Upstill | G06F 16/374 |
| | | | 704/10 |
| 10,176,167 B2 * | 1/2019 | Evermann | G06F 40/35 |
| (Continued) |

FOREIGN PATENT DOCUMENTS

WO    2019118377 A1    6/2019

OTHER PUBLICATIONS

12. Peng et al. 2016, "News Citation Recommendation with Implicit and Explicit Semantics", p. 390 (Year: 2016).*

(Continued)

*Primary Examiner* — Matthew J Ellis
(74) *Attorney, Agent, or Firm* — Patterson + Sheridan, LLP

(57) ABSTRACT

Aspects of the present disclosure provide techniques for intent matching. Embodiments include receiving input of text by a user via a user interface. Embodiments include determining weights for portions of the text based on a plurality of keywords. Embodiment include generating an embedding of the text. Embodiments include determining an intent of the text by weighting, based on the weights, word mover's distances from the embedding of the text to a known embedding of known text associated with the intent in order to determine a similarity measure between the text and the known text. Embodiments include providing content to the user via the user interface based on the intent.

20 Claims, 6 Drawing Sheets

(56) References Cited

U.S. PATENT DOCUMENTS

| | | | |
|---|---|---|---|
| 2014/0089286 A1 | 3/2014 | Delli Santi et al. | |
| 2015/0032452 A1* | 1/2015 | Lev-Tov | G06F 40/30 |
| | | | 704/245 |
| 2015/0242391 A1* | 8/2015 | Goel | G06F 40/30 |
| | | | 704/9 |
| 2017/0147919 A1* | 5/2017 | Lee | G06N 3/006 |
| 2017/0242886 A1* | 8/2017 | Jolley | G06F 40/205 |
| 2019/0057143 A1* | 2/2019 | Porter | G06Q 10/10 |
| 2019/0179890 A1* | 6/2019 | Evermann | G06F 40/35 |
| 2019/0182382 A1* | 6/2019 | Mazza | H04L 51/02 |
| 2020/0184307 A1* | 6/2020 | Lipka | G06F 16/9032 |
| 2020/0218781 A1* | 7/2020 | Takano | G06Q 30/016 |

OTHER PUBLICATIONS

13. Kusner et al. 2015 "From Word Embeddings to Document Distances" pp. 2-3 (Year: 2015).*

Mikolov et al. 2013, "Distributed Representations of Words and Phrases and their Compositionality". (Year: 2013).*

India Office Action issued to Patent Application No. 202147021457 dated Jul. 4, 2022.

International Search Report/ Written Opinion issued to PCT/US2020/033919 dated Aug. 27, 2020.

GALK6 Ferenc et al: "Biomedical Question Answering via Weighted Neural Network Passage Retrieval", Mar. 1, 2018 (Mar. 1, 2018), Annual International Conference on the Theory and Applications of Cryptographic Techniques. Eurocrypt 2018; [Lecture Notes in Computer Science; Lect. Notes Computer], Springer, Berlin, Heidelberg, pp. 523-528, XP047465952, ISBN: 978-3-642-17318-9 [retrieved on Mar. 1, 2018] abstract sections 1, 2, 2.1, 2.2; p. 523-p. 525 section 4; pp. 526-528.

Matt J Kusner et al: 11 From Word Embeddings To Document Distances, 1' Jul. 1, 2015 (Jul. 11, 2015), XP055723654, Retrieved from the Internet: URL:http://mkusner.github.io/publications/ <http://mkusner.github.io/publications/> WMD.pdf [retrieved on Aug. 19, 2020] abstract section 1,3, 4,6.

Gao Huang et al: "Supervised Word Mover's Distance", 1' Dec. 2016 (Dec. 1, 2016), XP055723354, Retrieved from the Internet: URL:http://papers.nips.cc/paper/6139-super <http://papers.nips.cc/paper/6139-super> vised-word-movers-distance.pdf [retrieved on Aug. 18, 2020] abstract section 2,3,4,6.

Jacob Devlin et al: "BERT: Pre-training of Deep Bidirectional Transformers for Language Understanding", May 24, 2019 (May 24, 2019), XP055723406, Retrieved from the Internet: URL:https://arxiv.org/pdf/1810.04805v2.pdf [retrieved on Aug. 18, 2020] abstract sections 1-3 and 6.

* cited by examiner

US 11,734,322 B2

ENHANCED INTENT MATCHING USING KEYWORD-BASED WORD MOVER'S DISTANCE

INTRODUCTION

Aspects of the present disclosure relate to techniques for determining user intent based on text provided by the user. In particular, embodiments described herein involve combining keyword matching and word mover's distance techniques to determine user intent.

BACKGROUND

Software applications often provide content to users based on input received from the users. For example, an application may provide users with relevant content in response to a search query or may provide automated responses to users via a chat bot. Furthermore, aspects of user interfaces may be adapted or customized for particular users, such as based on input from the users.

Determining user intent based on input text is often challenging for a variety of reasons. For example, variations in grammar and word choices, "noise" or irrelevant words, and imprecise word choices may lead to difficulties in determining the true intent of a user's utterance. Furthermore, words and phrases may have different meanings and different levels of significance in different domains. For example, the words "gross", "net", and "interest" have specific meanings in the domain of accounting that are different from their meanings in other contexts. Additionally, certain words and phrases may be so common within a given domain as to be practically irrelevant to a user's intent. For instance, the word "tax" may be so commonly used in the field of tax preparation that a user's inclusion of this word in given text is not helpful in matching the given text with content. In fact, matching the given text with content based even in part on the word tax may only serve to introduce noise into the matching process, resulting in matches with vast amounts of irrelevant content.

Inaccurate determinations of user intent may result in providing irrelevant or unwanted content to users, thereby negatively impacting a user's experience with respect to the application, and potentially causing the user to abandon the application. Moreover, inaccurate automated intent determinations increase users' reliance on live support resources, which is costly to an organization.

Accordingly, there is a need in the art for improved techniques for determining user intent based on text.

BRIEF SUMMARY

Certain embodiments provide a method. The method generally includes: receiving input of text by a user via a user interface; determining weights for portions of the text based on a plurality of keywords; generating an embedding of the text; determining an intent of the text by weighting, based on the weights, word mover's distances from the embedding of the text to a known embedding of known text associated with the intent in order to determine a similarity measure between the text and the known text; and providing content to the user via the user interface based on the intent.

Other embodiments provide a non-transitory computer-readable medium comprising instructions that, when executed by one or more processors of a computer system, cause the computer system to perform a method. The method generally includes: receiving input of text by a user via a user interface; determining weights for portions of the text based on a plurality of keywords; generating an embedding of the text; determining an intent of the text by weighting, based on the weights, word mover's distances from the embedding of the text to a known embedding of known text associated with the intent in order to determine a similarity measure between the text and the known text; and providing content to the user via the user interface based on the intent.

Other embodiments provide a system comprising one or more processors and a non-transitory computer-readable medium comprising instructions that, when executed by the one or more processors, cause the system to perform a method. The method generally includes: receiving input of text by a user via a user interface; determining weights for portions of the text based on a plurality of keywords; generating an embedding of the text; determining an intent of the text by weighting, based on the weights, word mover's distances from the embedding of the text to a known embedding of known text associated with the intent in order to determine a similarity measure between the text and the known text; and providing content to the user via the user interface based on the intent.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
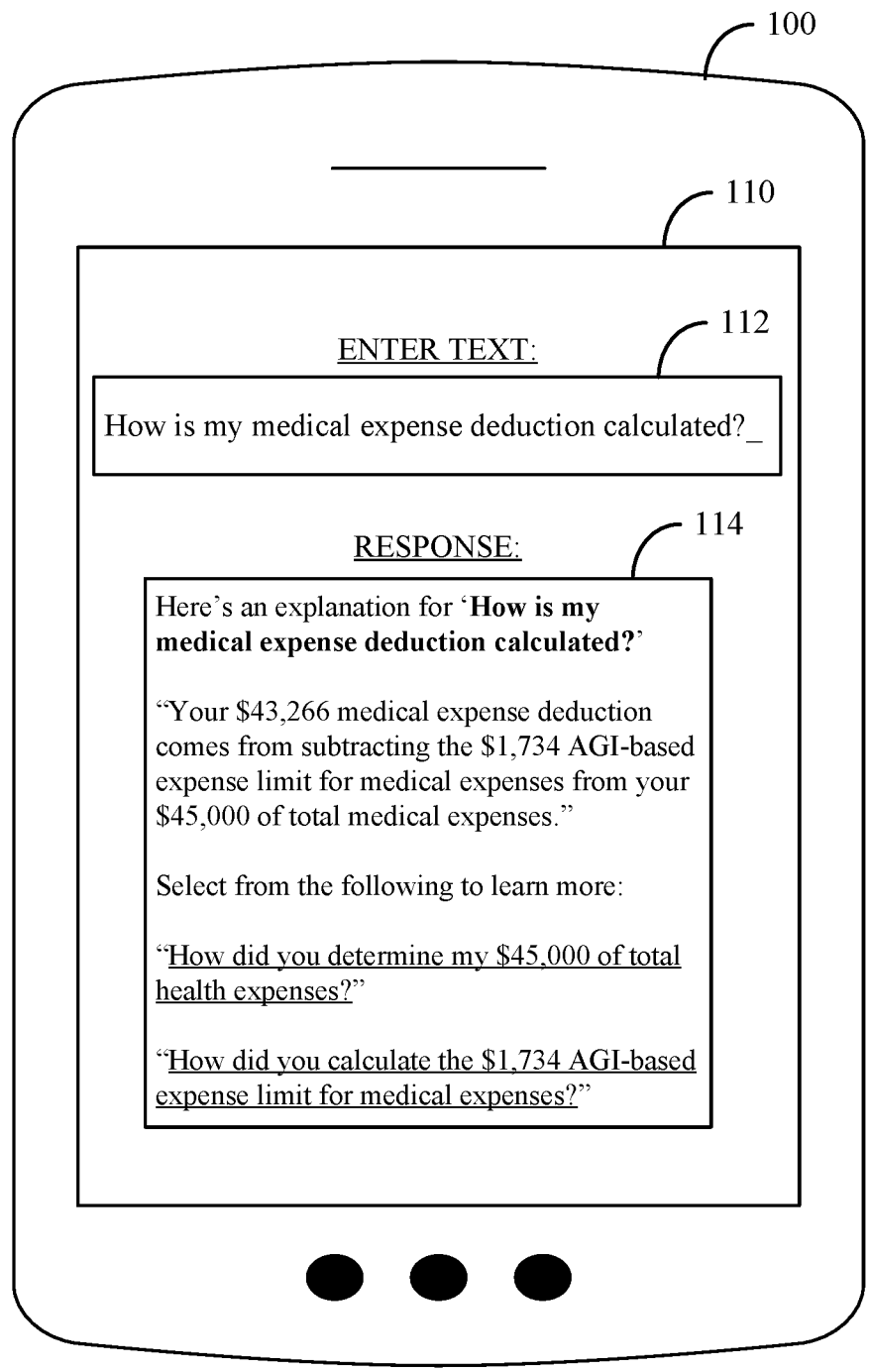
FIG. 1 depicts an example user interface for providing relevant content based on user intent.

Aspects of the present disclosure provide apparatuses, methods, processing systems, and computer readable mediums for determining intent using keyword-based word mover's distance.

Word mover's distance (WMD) generally refers to a technique for determining similarity between patterns, such as strings of text. WMD measures the dissimilarity between two patterns as the minimum amount of distance that the words of one pattern need to "travel" to reach the words of another pattern. In some embodiments, WMD is performed on embedded words. Embedded words are multi-dimensional representations (e.g., vectors comprising a series of n values that define a position in n-dimensional space). In some embodiments, existing techniques such as GloVe embeddings or Word2Vec are employed to generate word representations. An embedding generally refers to a multi-dimensional representation of text wherein words are represented by vectors. A representation of a given pattern, such as a given string of text, may be a matrix comprising a vector for each word in the pattern. The WMD between a first string and a second string is generally determined based on the Euclidean distances between points of the vectors in representations of the first string and the second string.

WMD may be used to determine whether text input by a user is similar to known text associated with a given intent. As used herein, intent generally refers to a meaning or purpose of a user, such as the meaning or purpose intended by a user through given input, and generally encompasses particular subject matter or topics. A given intent may be associated with a variety of content that can be provided to a user, such as through a user interface of a software application. Known text associated with a given intent may include, for example, titles of content pages that are associated with the intent. In another example, the intent corresponds to a node in a knowledge graph and the known text is a description of an operation performed by the node. While conventional WMD techniques are helpful in measuring similarities between text, they do have certain shortcomings. For example, if two strings share the word "tax", this may result in a shorter WMD between the two strings and therefore may contribute to a determination that the two strings are related. However, if the domain is tax preparation, the word "tax" may be used very frequently, and so two strings that have this word in common may not be particularly related to one another within the domain. Furthermore, other words and phrases may not be particularly relevant to a given domain, such as the words "find" and "help" (e.g., "can you help me find where to enter student loan interest deductions?"), and may also result in identification of irrelevant content for the user.

In order to address these issues, techniques described herein provide enhanced intent matching through integrating keyword matching and WMD (using word embeddings) into a single technical solution that amplifies the advantage of each individual technique while eliminating the flaws in each of them. In particular, the weighted word mover's distance methods disclosed herein beneficially infuse keyword information into the statistical WMD method to ensure that the statistical method pays higher attention to keywords that are important and less attention to common words that are not important to disambiguating different user utterances. With weighted word mover's distance, words, phrases, and/or parts of sentences are weighted based on whether they comprise keywords that are relevant to a particular domain, and these weights are used to modify a WMD calculation such that distances for highly-weighted portions of strings are penalized more heavily in calculating the overall WMD between two strings. As used herein, a "portion" of a string generally refers to a word or phrase in the string.

Weighted word mover's distance may be configured to determine similarity between text input by a user and known text associated with a given intent in order to determine whether the given intent is a match for the text input by the user. An intent may, for example, correspond to a given node in a knowledge graph, and the known text may be an English language description of an operations performed by the given node. In some embodiments, the node (or nodes) with a description that is most similar to the text input by the user is identified as the intent of the text. Once an intent is matched with the text input by the user, relevant content is dynamically selected based on the user's intent.

In one example, a user may input text into a chat window, and based on the user's text input, a user's intent may be predicted and content may be selected based on the predicted intent and provided to the user in an automated response by a chat bot. In another example, the content includes search results provided to the user in response to a query. Accordingly, techniques described herein allow for improved determinations of intent and automated dynamic selection of relevant content to provide within software applications based on intent.

Example User Interface for Providing Relevant Content Based on User Intent

FIG. 1 illustrates an example user interface 110 for providing relevant content based on user intent. User interface 110 runs on client device 100, which in this example is a mobile computing device. In alternative embodiments, client device 100 may be representative of another type of computing device, such as a laptop computer, desktop computer, or the like. FIG. 1 is described in conjunction with FIG. 2, which depicts an example embodiment related to determining intent using keyword-based word mover's distance, FIG. 3, which depicts an example of keyword-based weights related to determining intent, and FIG. 4, which depicts an example of keyword-based word mover's distances.

A user may access user interface 110 on client device 100 in order to interact with an application. In an example, user interface 110 is associated with a web application that runs on a remote computing device and is accessed by client device 100 over a network, while in other embodiments the application runs locally on client device 100. For example, the application may comprise an automated support system (e.g., for retrieval of frequently asked questions) or an automated chat system, such as a chat bot for assistance with the application.

User interface 110 includes field 112 in which a user enters text. In this example, the user enters the question "How is my medical expense deduction calculated?" For example, user interface 110 may allow the user to interact with a chat bot that corresponds to a tax preparation application, the chat bot analyzing and responding to text entered by the user via user interface 110.

User interface 110 further comprises field 114, in which a response to the question entered in field 112 is displayed. For example, as the user enters the question in field 112, the application may use keyword-based WMD techniques to identify an intent of the question and select content that is likely to be relevant to the question for display in field 114. In some embodiments, keyword-based WMD involves assigning weights to portions of the text entered in field 112 as well as determining a multi-dimensional representation of the text entered in field 112.

Figure 2:
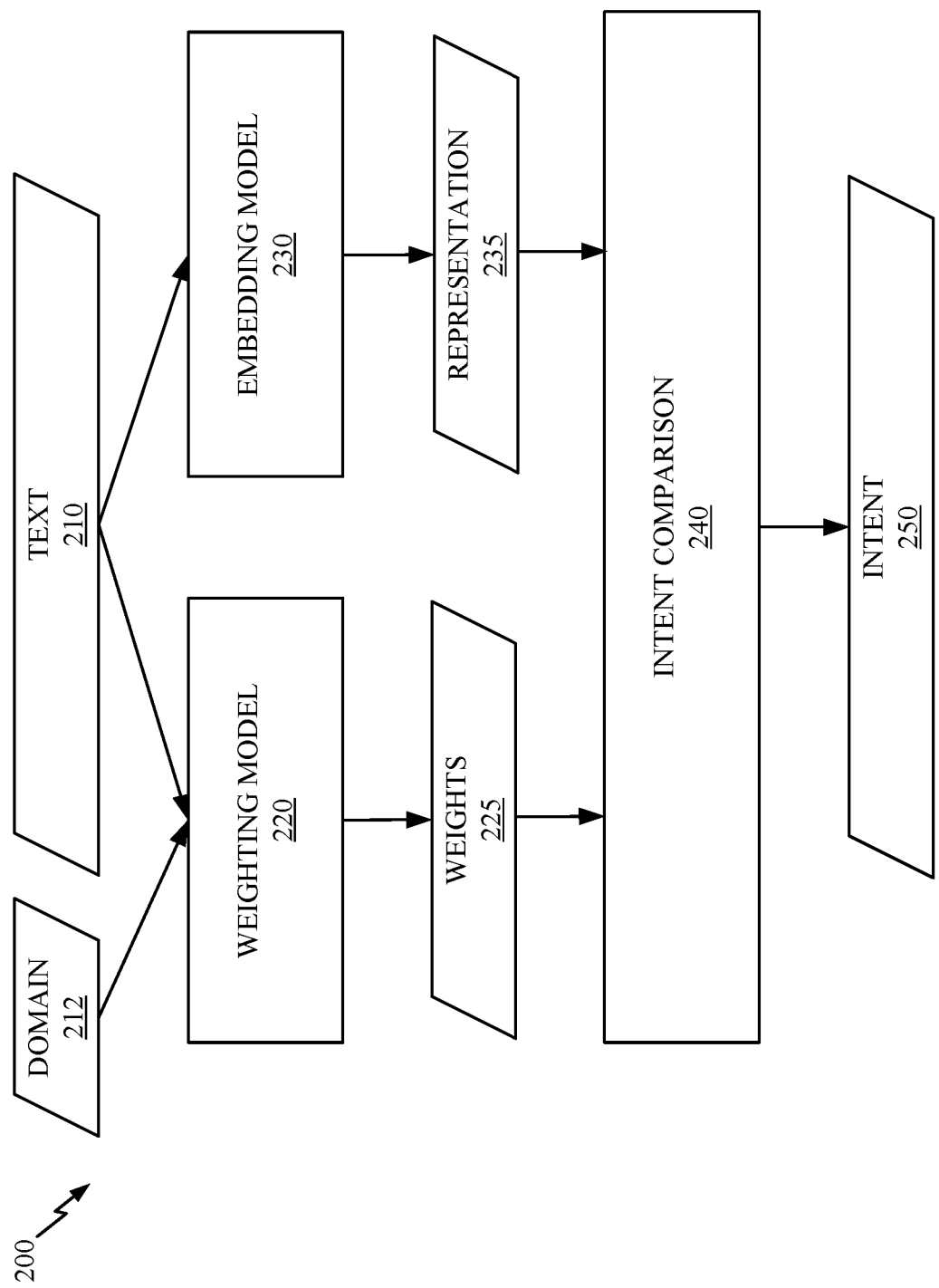
FIG. 2 depicts an example embodiment related to determining intent using keyword-based word mover's distance.

As shown in example 200 of FIG. 2, weights 225 and a representation 235 are determined based on text 210 (e.g., the text entered in field 114 of FIG. 1) for use in determining intent 250. While example 200 depicts the use of weighting model 220 and embedding model 230, it is noted that alternative embodiments may not involve the use of models, as described in more detail below.

Weighting model 220 generally comprises a machine learning model that has been trained based on domain-specific keywords to assign weights to portions of sentences. For instance, weighting model 220 may be a neural network. Neural network models generally include a plurality of connected units or nodes, which may also be referred to as artificial neurons. Each node generally has one or more inputs with associated weights, a net input function, and an activation function. Nodes are generally included in a plurality of connected layers, where nodes of one layer are connected to nodes of another layer, with various parameters governing the relationships between nodes and layers and the operation of the neural network.

Training a neural network generally involves iteratively adjusting parameters of the model based on training data. In general, training data for weighting model 220 may include a plurality of text strings associated with domain identifiers and labels indicating significance of parts of the text strings to the domain. In an example, training data is labeled by subject matter experts or professionals to indicate keywords and phrases that are significant to particular domains. In alternative embodiments, training data may be automatically generated by identifying frequencies of words and phrases in text associated with different domains. For instance, words that are used less frequently in a given domain may be identified as being more significant in that domain (e.g., because commonly-used words are less likely to be helpful in distinguishing between different text strings within the domain, such as "tax" in the domain of tax preparation).

Alternatively, a combination of automated and manually-guided techniques may be used to generate training data. For example, an automated process may be first be used to identify significant words for domains, and subject matter experts may then review and revise these automated determinations. In some embodiments, labels for the training data simply indicate whether or not a given word or phrase is significant within a given domain, while in other embodiments, the labels indicate relative weights of words or phrases within the domain.

In example 200, text 210 (e.g., the text input in field 112 of FIG. 1) and domain 212 (e.g., an identifier of a domain associated with text 210) are provided as inputs to weighting model 220, which has been trained as described above. In some embodiments, the application determines domain 212 based on context data associated with text 210. For instance, the context information may include information about the application, information about the user, clickstream data from the user, and the like. The domain 212 may, for instance, be determined based on a type of the application indicated in the context data. In alternative embodiments, different models are trained for different domains, and domain 212 is not provided as input. For instance, weighting model 220 may be a domain-specific model for domain 212, and domain 212 may not need to be provided as input to weighting model 220. Weighting model 220 outputs weights 225, which indicate relative significance of different portions of text 210.

Alternative embodiments involve assigning weights 225 without the use of a model, such as based on identifying keywords and phrases in text 210. For example, portions of text 210 could be assigned weights 225 based on whether they include certain keywords or phrases. In other embodiments, text 210 is filtered to remove words and phrases that are not keywords or phrases for domain 212 rather than assigning weights 225 to the non-keyword and phrases. For example, words considered to be stop words or words that are not significant within domain 212 may be filtered out of text 210. In alternative embodiments, portions of text 210 that do not include keywords or phrases for domain 212 are assigned a weight of 0.

Figure 3:
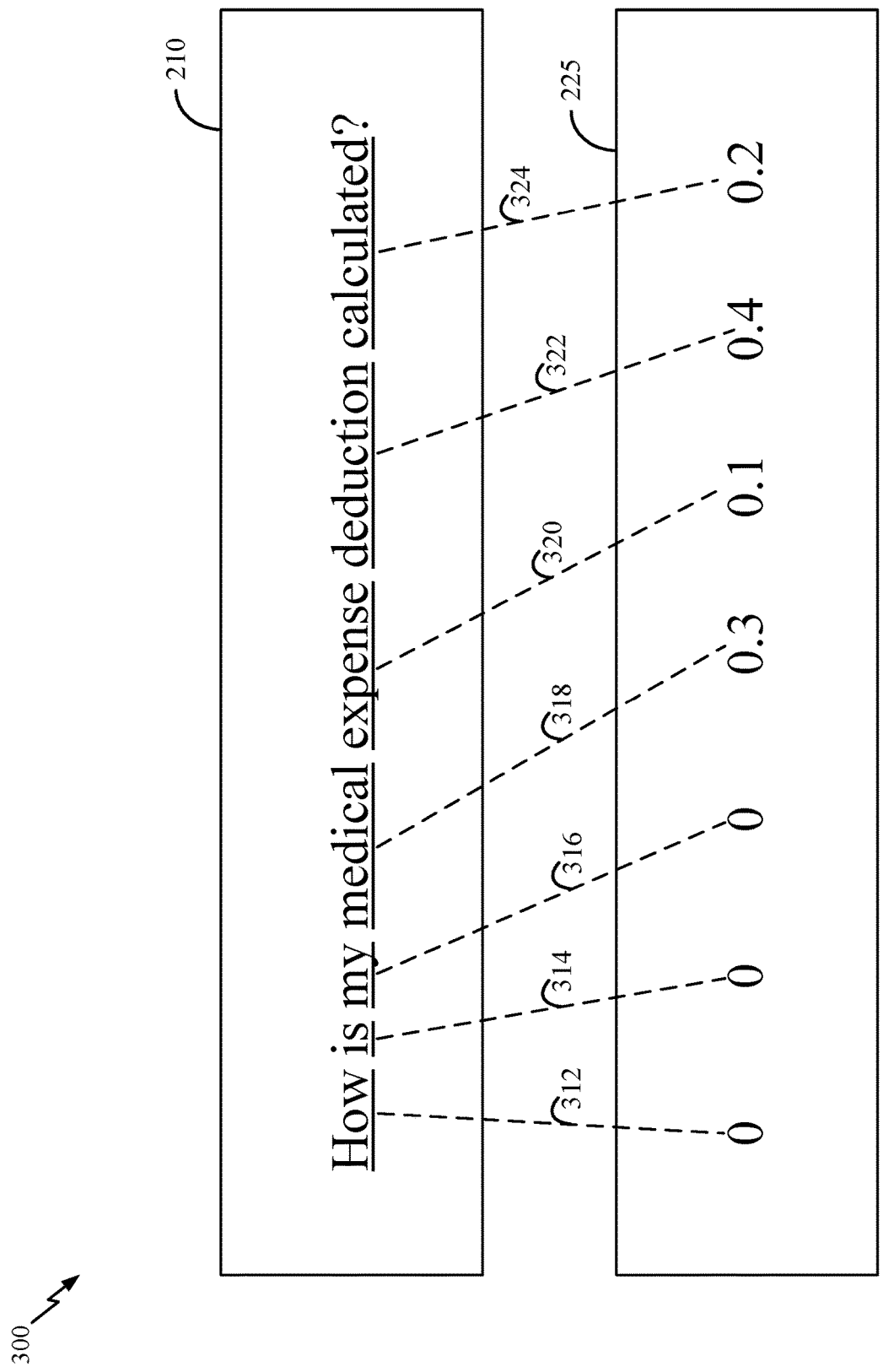
FIG. 3 depicts an example of keyword-based weights related to determining intent.
Figure 4:
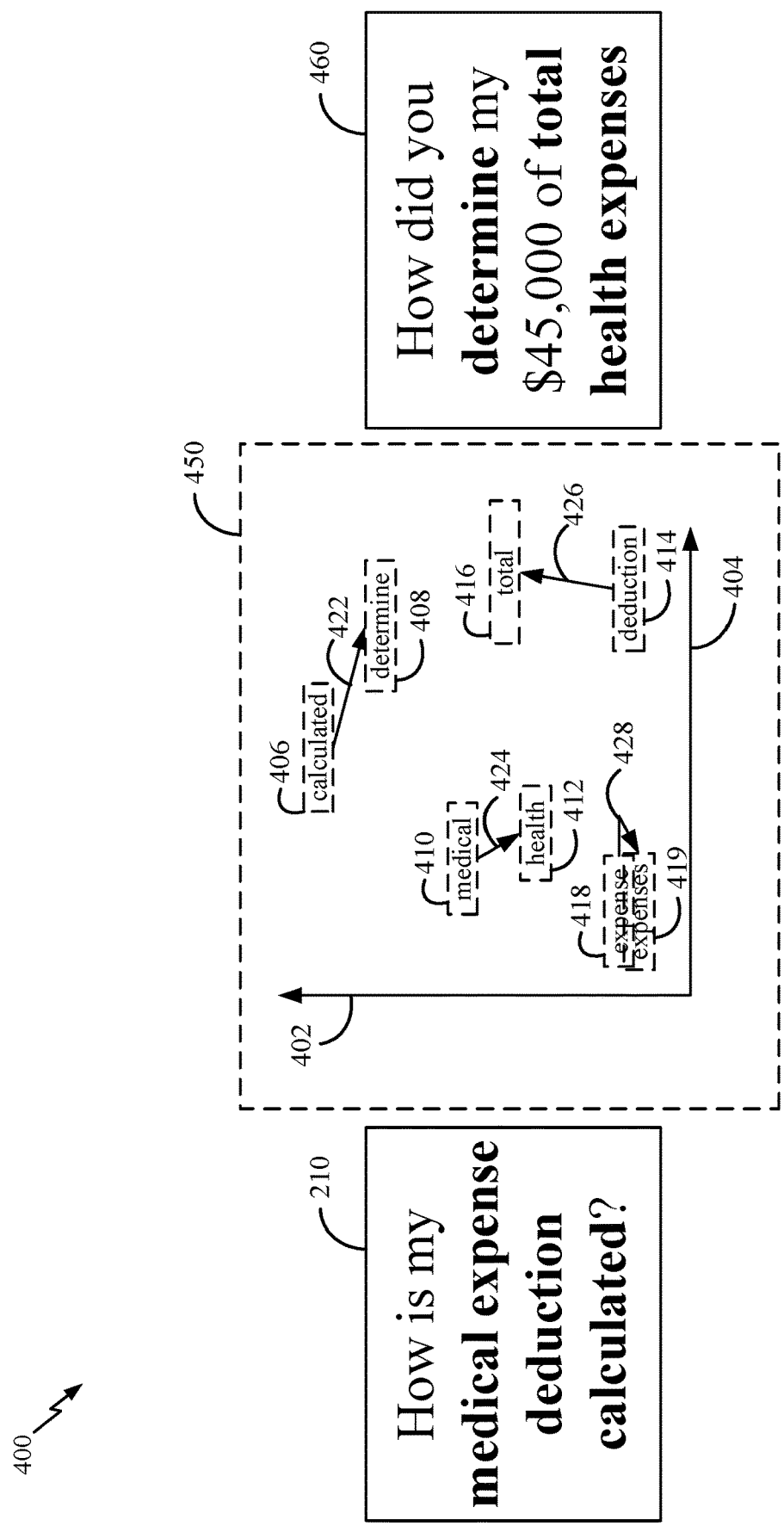
FIG. 4 depicts an example of keyword-based word mover's distances.

As shown in example 300 of FIG. 3, weights 225 may be normalized such that the weights of all portions of text 210 add up to 1. At 312, 314, and 316, the words "how", "is", and "my" are assigned weights of 0, such as because these words are not keywords or phrases within domain 212. At 318, "medical" is assigned a weight of 0.3. At 320, "expense" is assigned a weight of 0.1. At 322, "deduction" is assigned a weight of 0.4. At 324, "calculated" is assigned a weight of 0.2 Weights 225 generally represent the relative significance of the portions of text 210 to domain 212.

In example 200, text 210 is also provided to embedding model 230, which outputs a representation 235 of text 210. In certain embodiments, embedding model 230 is a neural network, and may comprise one or more bi-directional long short term memory (LSTM) layers. In one example, embedding model 230 comprises Bidirectional Encoder Representations from Transformer (BERT) techniques, which involve the use of masked language modeling to determine word embeddings. In other embodiments, embedding model 230 may involve existing embedding techniques, such as Word2Vec and GloVe embeddings. Representation 235 generally comprises a multi-dimensional representation of text 210, such as a matrix comprising vectors representing each word or phrase in text 210, or some subset of text 210, such as text 210 with stop words removed.

At the intent comparison 240 stage, weights 225 and representation 235 are used to compare text 210 to known text associated with different intents in order to determine an intent 250 of text 210. In some embodiments, intent comparison 240 involves weighted word mover's distance determinations as shown in example 400 of FIG. 4.

In example 400, text 210 is compared to known text 460 associated with intent 250 of FIG. 2. As illustrated in graph 450, a weighted WMD may be determined for each portion of text 210, excluding stop words (e.g., stop words include "how", "is", and "my"). Graph 450 includes a Y axis 402 and an X axis 416 representing 2 dimensions of an n-dimensional space in which words are embedded. It is noted that 2 dimensions are depicted for ease of illustration, but the n-dimensional space may include more than 2 dimensions.

A distance 422 is determined between representation 406 of "calculated" and representation 408 of "determine". A distance 424 is determined between representation 410 of "medical" and representation 412 of "health". A distance 426 is determined between representation 414 of "deduction" and representation 416 of "total". A distance 428 (which may be very close to zero) is determined between representation 418 of "expense" and representation 419 of "expenses". A weighted WMD between text 210 and known text 460 may be determined, for example, by multiplying distance 422 by the weight of 0.2 (e.g., the weight 225 assigned to "calculated" at 324 in FIG. 3), multiplying distance 424 by the weight of 0.3 (e.g., the weight 225 assigned to "medical" at 318 in FIG. 3), multiplying distance 426 by the weight of 0.4 (e.g., the weight 225 assigned to "deduction" at 322 in FIG. 3), multiplying distance 428 by the weight of 0.1 (e.g., the weight 225 assigned to "expense" at 320 in FIG. 3), and adding each of these results together.

In some embodiments, if the weighted WMD is below a threshold, then known text 460 and text 210 are determined to be related. In some embodiments, intent comparison 240 involves a series of similar weighted WMD determinations for a variety of known text strings associated with a variety of known intents in order to identify the intent 250 to which text 210 is most closely matched. For instance a plurality of texts strings may be mapped to each of a plurality of intents, and text 210 may be compared to each of the plurality of text strings for each intent through WMD determinations. Generally, a lower weighted WMD indicates a higher level of similarity.

Once intent 250 is determined, selected content is provided in field 114 in response to text 210 input in field 112. As shown in FIG. 1, the content displayed in field 114 may comprise a chat bot response indicating several pages that may be helpful in addressing the user's question, including "How did you determine my $45,000 of total health expenses?" and "How did you calculate the $1,734 AGI-based expense limit for medical expenses?" The user may then select these pages in order to view additional content relevant to its question. Accordingly, embodiments of the present disclosure improve applications by providing users with content that is accurately identified as relevant and avoiding providing users with irrelevant content.

It is noted that user interface 110 is included as an example, and other layouts and techniques for displaying relevant content to users of applications based on intent may be employed with techniques described herein.

Figure 5:
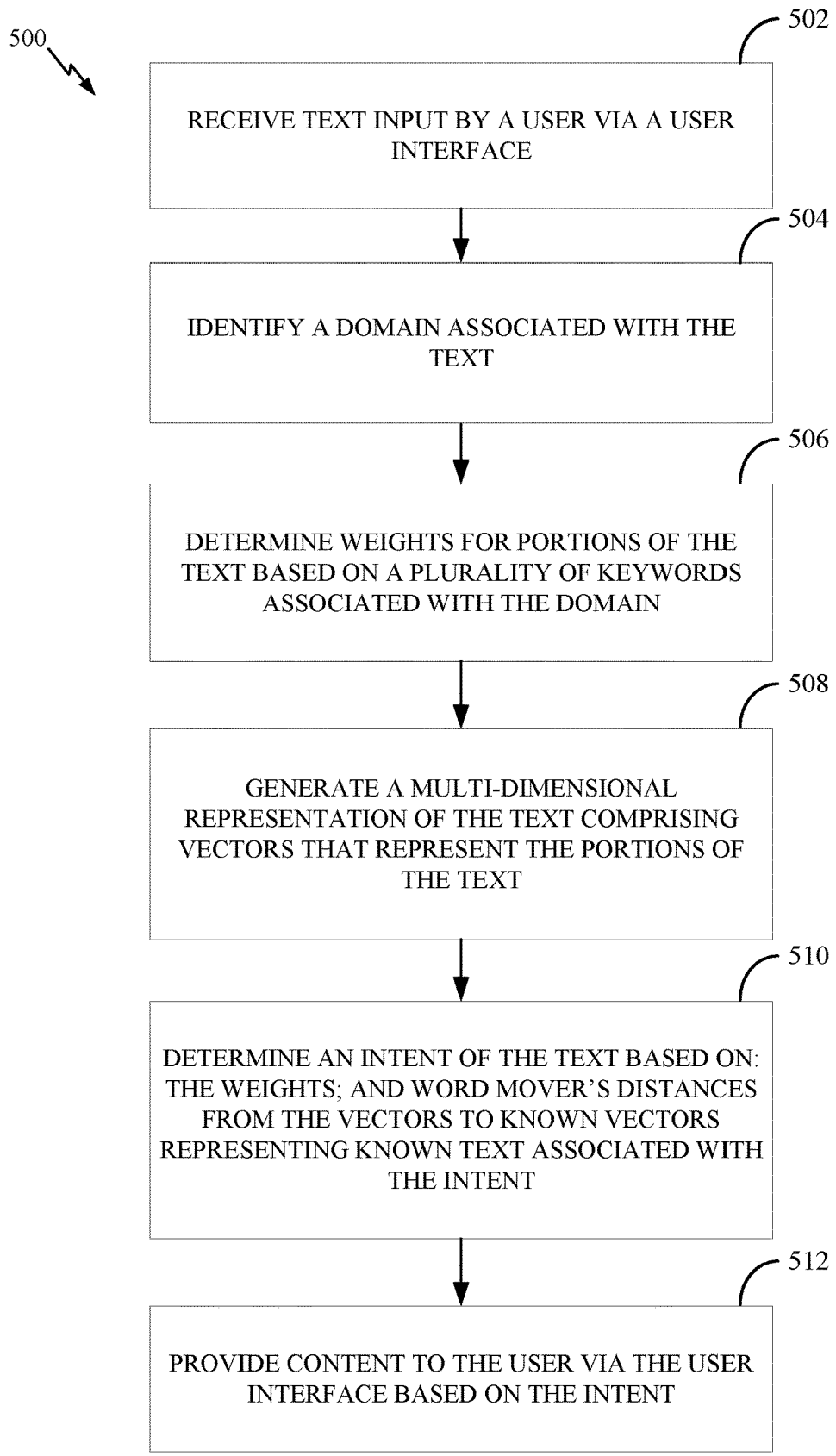
FIG. 5 depicts example operations 400 for determining intent using keyword-based word mover's distance.

Example Operations for Determining Intent Using Keyword-Based Word Mover's Distance FIG. 5 depicts example operations 500 for determining intent using weighted word mover distance. For example, operations 500 may be performed by application 614 of FIG. 6, as described below.

At step 502, text input by a user via a user interface is received. For instance text 210 of FIG. 2 may be entered in field 112 of FIG. 1, and may be received by application 614 of FIG. 6. In certain embodiments, the text may be input by voice, such as during an automated support phone call or through a voice interface provided by application 614 of FIG. 6. In other embodiments, the text is input through a keyboard or touchscreen or other input device.

At step 504, a domain associated with the text is identified. In an example, application 614 of FIG. 6 identifies the domain based on context information associated with the text, such as application information, user information, clickstream data, and/or the like.

At step 506, weights for portions of the text are determined based on a plurality of keywords associated with the domain. Keywords may include phrases. In an example, application 614 of FIG. 6 uses a model, such as weighting model 220 of FIG. 2, which may have been trained based on keywords associated with the domain, to determine the weights. In alternative embodiments, the weights may be determined by identifying domain-specific keywords in the text and weighting portions of the text based on whether or not they include the domain-specific keywords. Using domain-specific keywords allows for an improved focus on words and phrases that are highly relevant to a given domain while avoiding a focus on words and phrases that are not likely to be helpful in determining similarities between strings in the given domain.

At step 508, a multi-dimensional representation of the text comprising vectors that represent portions of the text is determined. In an example, application 614 of FIG. 6 uses a trained model, such as embedding model 230 to determine the multi-dimensional representation. The model may be a neural network comprising one or more bi-directional long short term memory (LSTM) layers. In certain embodiments, existing techniques such as BERT, Word2Vec, and/or GloVe embeddings may be used to determine the multi-dimensional representations.

At step 510, an intent of the text is determined based on the weighted word mover's distances (WMDs) from the vectors to known vectors representing known text associated with the intent. In certain embodiments, WMDs between the vectors of the multi-dimensional representation and the known vectors representing the known text are weighted based on the weights such that distances for higher-weighted vectors result in higher WMDs. In some embodiments, the intent is determined to be the intent of the text based on a determination that WMDs between the vectors and the known vectors are below a threshold. In some embodiments, if multiple intents match the text, then the intent with the lowest WMD is identified as the intent of the text. In alternative embodiments, content may be selected from more than one intent.

At step 512, content is provided to the user via the user interface based on the intent. In an embodiment, the content is associated with the intent, and application 614 of FIG. 6 dynamically selects the content based on the determination at step 510 that the intent corresponds to the text. For example, a mapping between the content and the intent may be stored in association with the application. In certain embodiments, the content comprises a response by a chat bot provided in a chat window via the user interface. In other embodiments, the content comprises search results. In other embodiments, the content comprises one or more pages related to the text.

Example Computing System for Determining Intent Using Weighted WMD

Figure 6:
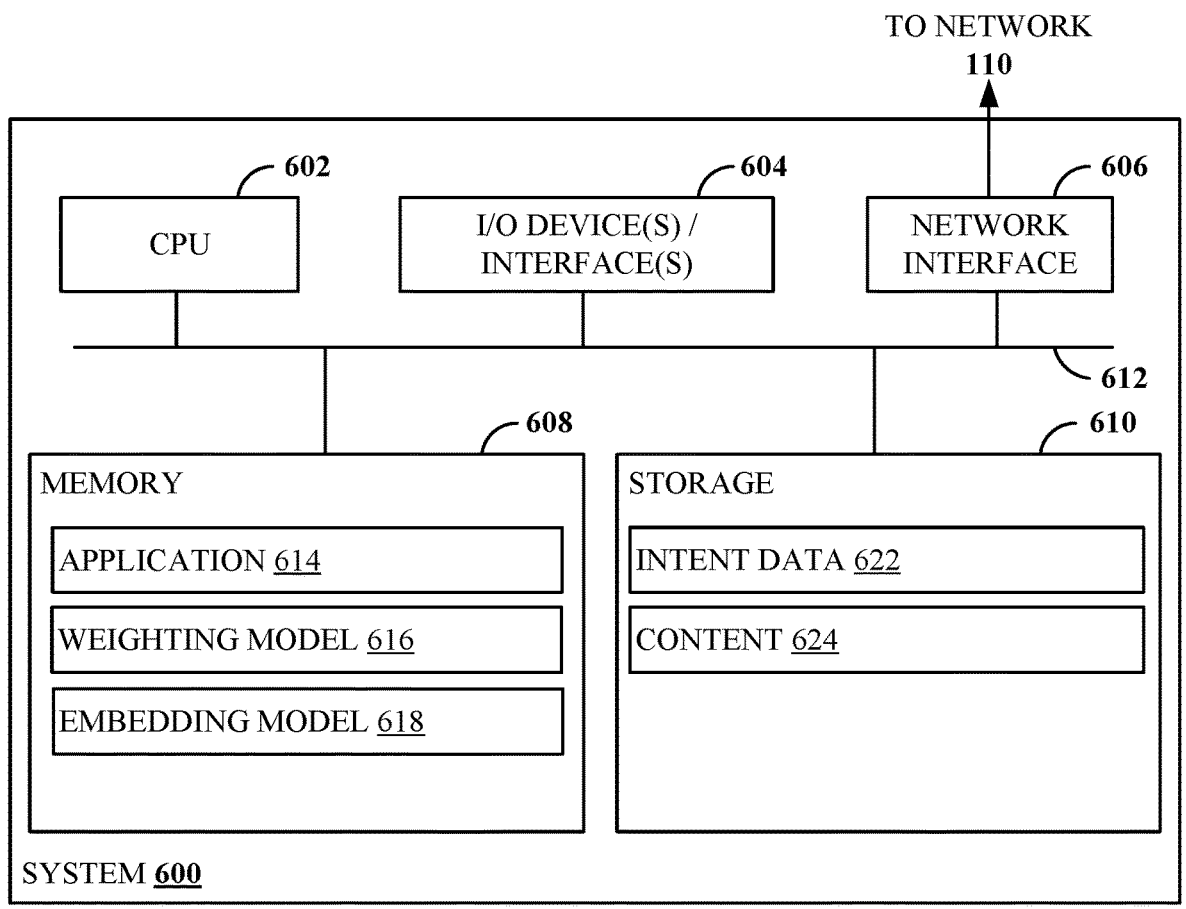
FIG. 6 depicts an example processing system for determining intent using keyword-based word mover's distance.

FIG. 6 illustrates an example system 600 with which embodiments of the present disclosure may be implemented. For example, system 600 may be representative of client device 100 of FIG. 1 and/or other types of computing devices, such as a server, and may perform operations 500 of FIG. 5.

System 600 includes a central processing unit (CPU) 602, one or more I/O device interfaces 604 that may allow for the connection of various I/O devices 614 (e.g., keyboards, displays, mouse devices, pen input, etc.) to the system 600, network interface 606, a memory 608, storage 610, and an interconnect 612. It is contemplated that one or more components of system 600 may be located remotely and accessed via a network. It is further contemplated that one or more components of system 600 may comprise physical components or virtualized components.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 is included to be representative of a single CPU, multiple CPUs, a single CPU having multiple processing cores, and other arrangements.

Additionally, the memory 608 is included to be representative of a random access memory. As shown, memory 608 includes application 614, which may be representative of an application corresponding to user interface 110 of FIG. 1. For example, application 614 may allow users to input text and retrieve content relevant to the text via a user interface, such as user interface 110 of FIG. 1. Furthermore, application 614 may perform weighted WMD determinations in order to identify intents and associated content based on text entered by the users. Memory 608 further comprises weighting model 616 and embedding model 618, which may be representative of weighting model 220 and embedding model 230 of FIG. 2.

Storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

Storage 610 comprises intent data 622 and content 624. Intent data 622 generally includes intents associated with known text, such as content pages that are known to be associated with the intents. Content 624 generally includes text content that can be provided to users via user interface 110 of FIG. 1, such as help pages, guides, chat bot response content, articles, links, multimedia content, and the like. In some embodiments, each item of content in content 624 is associated with a given intent in intent data 622, and includes text, such as a description of an operation performed by a node that corresponds to the given intent in a knowledge graph, that is compared to text input by users to determine matches based on keyword-based WMD techniques described herein. While intent data 622 and content 624 are depicted in local storage of system 600, it is noted that intent data 622 and/or content 624 may also be located remotely (e.g., at a location accessible over a network, such as the Internet).

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   receiving input of text by a user via a user interface;
   determining weights for portions of the text based on a plurality of keywords associated with a domain related to the text, wherein the weights are normalized such that a sum of the weights is a given predetermined value;
   generating embeddings of words in the text;
   determining a similarity measure between the text and known text associated with an intent by:
     determining a first word mover's distance between a first embedding of the embeddings and a first known embedding of a first corresponding word in the known text;
     determining a second word mover's distance between a second embedding of the embeddings and a second known embedding of a second corresponding word in the known text;
     multiplying the first word mover's distance by a first weight of the weights that corresponds to the first embedding to produce a first product that represents a similarity between the first embedding and the first known embedding weighted according to a first significance to the domain of the first embedding relative to other embeddings of the embeddings;
     multiplying the second word mover's distance by a second weight of the weights that corresponds to the second embedding to produce a second product that represents a similarity between the second embedding and the second known embedding weighted according to a second significance to the domain of the second embedding relative to other embeddings of the embeddings; and
     calculating the similarity measure based on the first product and the second product;
   determining that the intent is associated with the text based on the similarity measure between the text and the known text; and
   providing content to the user via the user interface based on the intent.

2. The method of claim 1, wherein determining the weights for the portions of the text based on the plurality of keywords comprises:
   providing input to a model based on the text, wherein the model has been trained based on the plurality of keywords; and
   receiving output from the model indicating the weights.

3. The method of claim 1, wherein generating the embeddings of the words in the text comprises:
   providing one or more inputs to a model based on the text; and
   receiving the embeddings as one or more outputs from the model.

4. The method of claim 3, wherein the model comprises a bi-directional long short term memory (LSTM) layer.

5. The method of claim 1, wherein providing the content to the user via the user interface based on the intent comprises:
   determining that the content is relevant to the text based on a mapping between the content and the intent; and
   providing the content to the user interface for display.

6. The method of claim 1, further comprising determining the domain based on context information associated with the text.

7. The method of claim 1, wherein providing the content to the user via the user interface based on the intent comprises providing a response by a chat bot to the user.

8. A system, comprising one or more processors and a non-transitory computer-readable medium comprising instructions that, when executed by the one or more processors, cause the system to:
receive input of text by a user via a user interface;
determine weights for portions of the text based on a plurality of keywords associated with a domain related to the text, wherein the weights are normalized such that a sum of the weights is a given predetermined value;
generate embeddings of words in the text;
determining a similarity measure between the text and known text associated with an intent by:
  determining a first word mover's distance between a first embedding of the embeddings and a first known embedding of a first corresponding word in the known text;
  determining a second word mover's distance between a second embedding of the embeddings and a second known embedding of a second corresponding word in the known text;
  multiplying the first word mover's distance by a first weight of the weights that corresponds to the first embedding to produce a first product that represents a similarity between the first embedding and the first known embedding weighted according to a first significance to the domain of the first embedding relative to other embeddings of the embeddings;
  multiplying the second word mover's distance by a second weight of the weights that corresponds to the second embedding to produce a second product that represents a similarity between the second embedding and the second known embedding weighted according to a second significance to the domain of the second embedding relative to other embeddings of the embeddings; and
  calculating the similarity measure based on the first product and the second product;
determine that the intent is associated with the text based on the similarity measure between the text and the known text; and
provide content to the user via the user interface based on the intent.

9. The system of claim 8, wherein determining the weights for the portions of the text based on the plurality of keywords comprises:
providing input to a model based on the text, wherein the model has been trained based on the plurality of keywords; and
receiving output from the model indicating the weights.

10. The system of claim 8, wherein generating the embeddings of the words in the text comprises:
providing one or more inputs to a model based on the text; and
receiving the embeddings as one or more outputs from the model.

11. The system of claim 10, wherein the model comprises a bi-directional long short term memory (LSTM) layer.

12. The system of claim 8, wherein providing the content to the user via the user interface based on the intent comprises:
determining that the content is relevant to the text based on a mapping between the content and the intent; and
providing the content to the user interface for display.

13. The system of claim 8, wherein the instructions, when executed by the one or more processors, further cause the system to determine the domain based on context information associated with the text.

14. The system of claim 8, wherein providing the content to the user via the user interface based on the intent comprises providing a response by a chat bot to the user.

15. A non-transitory computer-readable medium comprising instructions that, when executed by one or more processors of a computing system, cause the computing system to:
receive input of text by a user via a user interface;
determine weights for portions of the text based on a plurality of keywords associated with a domain related to the text, wherein the weights are normalized such that a sum of the weights is a given predetermined value;
generate embeddings of words in the text;
determine a similarity measure between the text and known text associated with an intent by:
  determining a first word mover's distance between a first embedding of the embeddings and a first known embedding of a first corresponding word in the known text;
  determining a second word mover's distance between a second embedding of the embeddings and a second known embedding of a second corresponding word in the known text;
  multiplying the first word mover's distance by a first weight of the weights that corresponds to the first embedding to produce a first product that represents a similarity between the first embedding and the first known embedding weighted according to a first significance to the domain of the first embedding relative to other embeddings of the embeddings;
  multiplying the second word mover's distance by a second weight of the weights that corresponds to the second embedding to produce a second product that represents a similarity between the second embedding and the second known embedding weighted according to a second significance to the domain of the second embedding relative to other embeddings of the embeddings; and
  calculating the similarity measure based on the first product and the second product;
determine that the intent is associated with the text based on the similarity measure between the text and the known text; and
provide content to the user via the user interface based on the intent.

16. The non-transitory computer-readable medium of claim 15, wherein determining the weights for the portions of the text based on the plurality of keywords comprises:
providing input to a model based on the text, wherein the model has been trained based on the plurality of keywords; and
receiving output from the model indicating the weights.

17. (Previouslsy Presented) The non-transitory computer-readable medium of claim 15, wherein generating the embeddings of the words in the text comprises:
providing one or more inputs to a model based on the text; and
receiving the embeddings as one or more outputs from the model.

18. The non-transitory computer-readable medium of claim 17, wherein the model comprises a bi-directional long short term memory (LSTM) layer.

19. The non-transitory computer-readable medium of claim 15, wherein providing the content to the user via the user interface based on the intent comprises:
   determining that the content is relevant to the text based on a mapping between the content and the intent; and
   providing the content to the user interface for display.

20. The non-transitory computer-readable medium of claim 15, wherein the instructions, when executed by the one or more processors, further cause the computing system to determine the domain based on context information associated with the text.

* * * * *